(No Model.)
J. L. TREXLER.
TRUCK FOR MOVING PLOWS.
No. 278,375. Patented May 29, 1883.
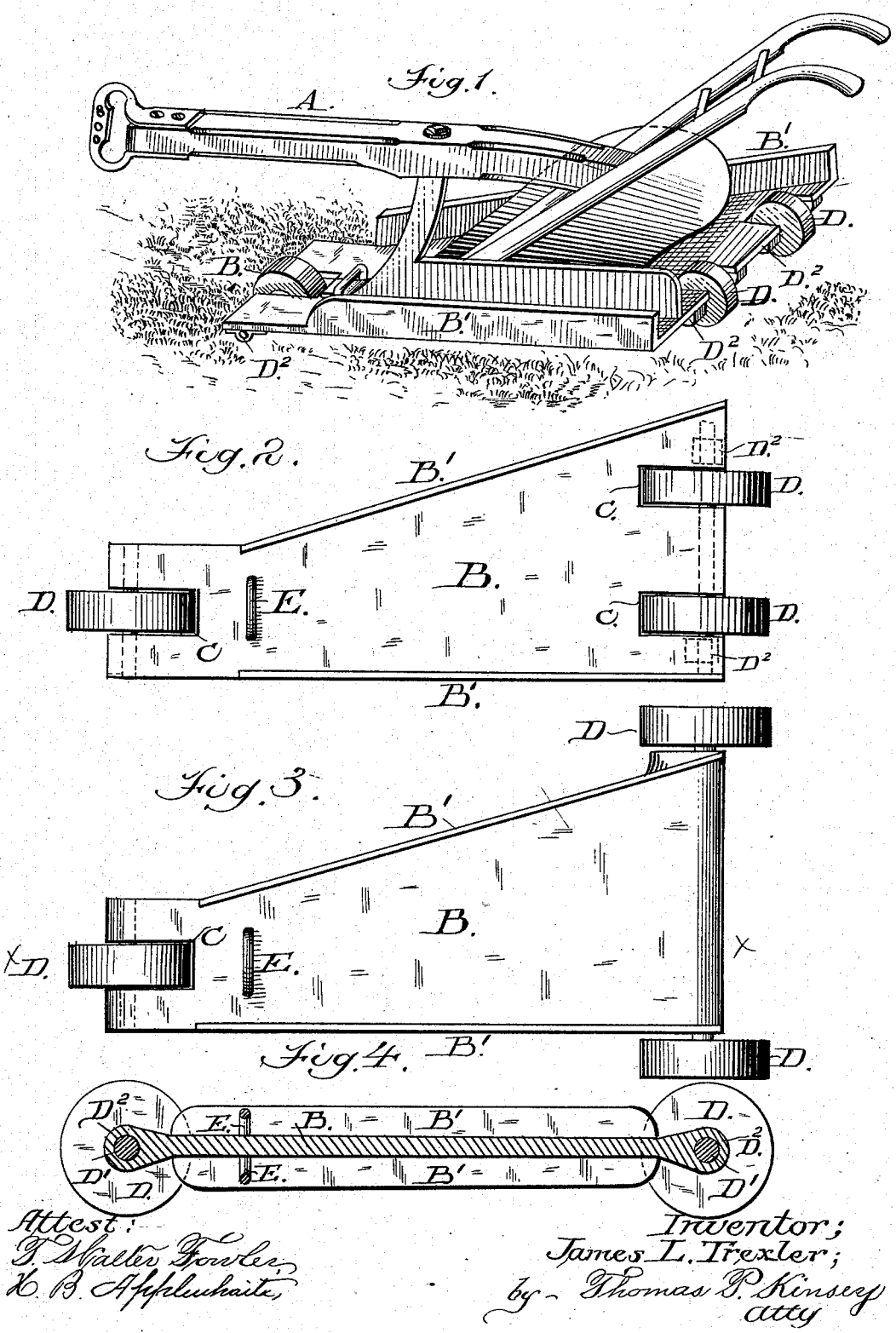

UNITED STATES PATENT OFFICE.

JAMES L. TREXLER, OF MERTZTOWN, PENNSYLVANIA.

TRUCK FOR MOVING PLOWS.

SPECIFICATION forming part of Letters Patent No. 278,375, dated May 29, 1883.

Application filed April 4, 1883. (No model.)

*To all whom it may concern:*

Be it known that I, JAMES L. TREXLER, a citizen of the United States, residing at the village of Mertztown, county of Berks, State of Pennsylvania, have invented a new and useful Improvement in Plow Trucks or Carriers, of which the following is a specification.

This improvement relates more particularly to an arrangement for the transportation of the plow upon the highway or over the farm, and its protection from wear and fracture while being transported.

The object of my invention is to furnish the farmer with a simple, handy, and ready means of shifting his plow without the risk of dulling or breaking it, and without assistance from others. This result is attained by the use of the apparatus shown in the accompanying drawings, in which similar parts are designated by similar letters.

Figure 1 is a perspective view of a right-hand truck with a plow mounted thereon. Fig. 2 is a plan of the truck with the plow off; Fig. 3, a reversible truck, being a plan view; Fig. 4, a horizontal section on the line $x\,x$.

A represents the plow; B, the truck-floor; B', ledges on the sides; C, slots cut out of the floor to admit the wheels; D, the wheels; D', the axles or pins; $D^2$, bearings for the axles or pins. E represents a loop or staple to catch over the nose of the plow.

The usual custom with farmers is to load the plow upon a wagon when it is to be taken to a distant field. This requires assistance to load and unload the same, besides throwing the wagon out of service for the time thus occupied. Frequently, also, the farmer has a wooden shoe secured to the sole of the plow, and it is drawn from point to point by the horses attached to the plow. The latter plan throws considerable strain upon the plowman, to prevent the capsizing of the plow while in transit, and the shoes are rapidly worn out.

With my improvement the truck-wheels are blocked, the horses with the plow driven toward the same, the handles of the plow are depressed when the truck is reached, which throws the nose upon the floor, and the motion being continued the plow is drawn forward until the nose enters the loop or staple E at the front. The blocking is then removed, and the plow may be carried wherever desired, the plowman merely placing his hands upon the handles to steady the same, which requires no exertion on his part.

I have shown in Figs. 1 and 2 the rear wheels placed in slots in the floor, within the ledges of the same; but, if desired, the wheels may be placed outside of the ledges, as in Figs. 3 and 4, which gives a larger base. The first will pass through a narrower space than the latter.

I prefer to make the floor, ledges, and bearings of cast-iron in one piece, and the loop or staple E, of wrought-iron, may be inserted in the mold, and thus be secured in place at the time of casting, or it may be inserted in holes cast in the floor and riveted therein, or be threaded and secured by nuts.

The truck, as shown in Figs. 1 and 2, would be constructed as either a right or left hand one, to suit the plow to be carried thereon; but for large farmers, using both right and left hand plows, I offer the reversible truck shown in Figs. 3 and 4, which will receive either style of plow by simply turning over the truck, which will throw the angular side to the right or left to receive the mold-board.

In the construction shown in Figs. 1 and 2 the bearings $D^2$ project below the floor, while in Figs. 3 and 4 the bearings are made central to the floor thickness, so that the floor will be at the same height above the ground, whether carrying a right or left hand plow. In the latter style a larger-sized set of wheels will be required than would be used with Figs. 1 and 2.

The floor may be of hard wood or of wrought-iron; but I give preference to cast-iron, as being more readily fitted up, and ample strength may be secured without excessive weight.

Having shown the construction, arrangement, and advantages of my improvements, I desire to secure by Letters Patent the following claims:

1. A truck for carrying plows, containing the following elements: a triangular floor provided with side ledges, a loop for the plow-nose, a single fore wheel, and two rear wheels suitably mounted upon axles or pins, having bearings for the same cast with or attached to the floor, the floor being removed above the wheels, for the purpose shown and described.

2. A truck for carrying plows, having its opposite floor-faces fitted with ledges and loops in duplicate, and the bearings for the axles or pins of the wheels cast or constructed central to the floor thickness, whereby the same is adapted by reversal to carry either a right or left hand plow, substantially as shown, and for the purpose set forth.

JAMES L. TREXLER.

Witnesses:
THOMAS P. KINSEY,
JOHN B. GRISSINGER.